United States Patent
Tajima et al.

(10) Patent No.: US 7,520,646 B2
(45) Date of Patent: Apr. 21, 2009

(54) LIGHTING DIRECTION CONTROL APPARATUS

(75) Inventors: Keiichi Tajima, Shizuoka (JP); Tetsuya Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 20 days.

(21) Appl. No.: 11/520,525

(22) Filed: Sep. 12, 2006

(65) Prior Publication Data
US 2007/0058380 A1    Mar. 15, 2007

(30) Foreign Application Priority Data
Sep. 13, 2005    (JP) ............ P.2005-264534

(51) Int. Cl.
F21V 17/02 (2006.01)
F21V 19/02 (2006.01)
F21V 21/14 (2006.01)
B60Q 1/00 (2006.01)

(52) U.S. Cl. .............. 362/512; 362/466; 362/523; 362/531

(58) Field of Classification Search ............. 362/496, 362/512, 523, 531
See application file for complete search history.

(56) References Cited

U.S. PATENT DOCUMENTS

| | | | | |
|---|---|---|---|---|
| 3,953,726 | A * | 4/1976 | Scarritt, Sr. | 362/465 |
| 6,984,060 | B2 | 1/2006 | Baba et al. | |
| 2002/0163815 | A1* | 11/2002 | Hayami | 362/466 |
| 2004/0057240 | A1* | 3/2004 | Baba et al. | 362/467 |
| 2007/0035268 | A1 | 2/2007 | Goto et al. | 318/685 |

FOREIGN PATENT DOCUMENTS
JP    2004106770    4/2004

* cited by examiner

Primary Examiner—Hargobind S Sawhney
Assistant Examiner—David J Makiya
(74) Attorney, Agent, or Firm—Fish & Richardson P.C.

(57) ABSTRACT

An initialization function of a lighting direction control apparatus of a vehicle lamp is provided with functions: for swinging, in a first direction, a lamp across the initial position until the lamp is bumped; for swinging, in the opposite direction (a second direction), the lamp from the bumped position across the initial position at a predetermined angle; and for swinging, in the first direction, the lamp at an angle across the initial direction. The bumped position is defined as a deflection angle position at which the headlamp does not dazzle the driver of a car approaching from the opposite direction. The predetermined angle is defined as an angle greater than a reflection error angle that is generated at the bumping time.

5 Claims, 10 Drawing Sheets

LIGHTING DIRECTION CONTROL APPARATUS

This application claims foreign priority from Japanese Patent Application No. 2005-264534, filed on Sep. 13, 2005, the entire contents of which are hereby incorporated by reference.

BACKGROUND OF THE INVENTION

1. Field of the Invention

The present invention relates to a lighting direction control apparatus that changes the lighting direction of a lamp, such as the headlamps of a vehicle such as an automobile. The present invention relates particularly to a lighting direction control apparatus that employs a brushless motor as a drive source for a drive mechanism that changes a lighting direction.

2. Related Art

In order to ensure improved safety for an automobile in motion, a lighting direction control apparatus is provided that controls the lighting directions of headlamps, to the left and to the right, in consonance with the steering direction, and that especially when an automobile is turning a curve in a road or is cornering, directs a light axes of the headlamps forward in a direction of travel in accordance with the steering angle. For example, as shown in FIG. 1, which will be referred later in a first exemplary embodiment of the present invention, in consonance with the direction of travel control provided by a steering wheel SW in an automobile CAR, the light axes (in this case, of projector lamps 3, which are incorporated components of individual headlamps and can be horizontally deflected) of left and right headlamps LHL and RHL are horizontally deflected to control the lighting direction. When the steering angle is 0, i.e., when the automobile CAR is travelling directly forward, this lighting direction control apparatus stabilizes the headlamps so they are pointed forward in the direction of travel. When the steering angle is changed, to the left or right, the lighting direction control apparatus deflects the headlamps to the left or right in consonance with the angle change. In order for such a deflection to be performed, a sensor must be provided for each headlamp to detect a headlamp deflection angle, and the output of the sensor is used to control the deflection angle of the headlamp. However, since the structure of the control apparatus becomes complicated when the angle sensor is provided, it has been proposed that the deflection angle of the headlamp be detected by controlling the rotational angle of a motor that serves as the drive source for a headlamp deflection drive mechanism (an actuator) that is closely related to the deflection angle of the headlamp, e.g., by controlling a count value for a brushless motor. That is, when a correlation between the deflection angle of the headlamp and the count value of the brushless motor is obtained in advance, thereafter, only the count value for the brushless motor need be controlled for the deflection angle of the headlamp to be adjusted.

For the lighting direction control apparatus, a so-called initialization is required, i.e., a forward position in the direction of travel of the automobile, or a predetermined deflection angle position near this is set as the initial head lamp position, and the count value, at this time, for the brushless motor is obtained. As the basic initialization method, until rotation of the brushless motor is halted, the headlamp is deflected to the deflection limit in one direction, and this state is defined as a bumped state. While this bumped position is regarded as the initial position, the current count value for the brushless motor must be obtained.

However, during the initialization process, when the brushless motor is bumped to the bumped position in one direction, backlash occurs in a plurality of gears constituting a drive mechanism for deflecting the headlamp, or the gears in the rotational direction will be deformed. Then, an overrun may occur, i.e., although the deflection movement of the headlamp is halted, there may be a further small angular rotation of the brushless motor. Because of this overrun, an error caused by the backlash or the gear deformation will be included in the count value obtained for the brushless motor by the initialization. Thus, on initialization, the reliability is degraded, and thereafter, deflection control accuracy for the headlamp is reduced. It should be noted that overrun due to the above described backlash and overrun due to gear deformation are, for example, about 0.3° and 0.5°, when used to describe deflection angles for headlamps.

FIG. 10A is a graph showing a correlation between the count value for a brushless motor and the deflection angle of a headlamp. Assume that by rotating the brushless motor the headlamp is deflected in one direction and is bumped to the initial position (0°) for the forward travel of an automobile. The angle set for the headlight is 0°; however, due to the above described backlash and the deformation of the actuator gears, there is an overrun that is equivalent to a deflection angle, and accordingly, an error occurs. Therefore, the next time the brushless motor is rotated in the reverse direction, the error attributable to the overrun is not corrected. Further, during a period wherein the error due to the overrun is corrected, the correlation between the deflection angle of the headlamp and the count value for the brushless motor is lost, and hysteresis occurs. Thus, so long as hysteresis is present, the headlamp can not be deflected accurately.

In order to resolve the initialization error due to the overrun, a two-sided bumping method and a one-sided bumping method have been proposed. According to the two-sided bumping method, as described in JP-A-2004-106770, a headlamp is bumped to a position at which the headlamp can be deflected to the maximum angle (almost 1°) in a widthwise center direction (hereinafter referred to as the inward direction) of an automobile from the forward direction of travel of the automobile, and the current count value for the brushless motor is obtained.

Further, the headlamp is bumped to a position at which the headlamp can be deflected to the maximum angle (almost 20°) to the left and to the right (hereinafter referred to as the outward direction) of the automobile from the forward direction of travel, which is the direction the reverse of the inward direction, and the current count value for the brushless motor is also obtained. These obtained count values for the inward and outward bumped positions are employed to calculate a count value that corresponds to the initial position of the headlamp.

In this manner, the initialization is performed. By using the two-sided bumping method, since overruns at the individual bumped positions occur in directions opposite to each other, the overruns can offset each other, and the initialization errors due to the overruns can be corrected. However, using the two-sided bumping method, the operations for bumping the headlamp in both the inward direction and the outward direction are required, so that it takes time to perform the initialization.

According to the one-sided bumping method, until the rotation of a brushless motor is halted, a headlamp is deflected to the deflection limit in one direction, and is set to the bumped state. Then, in this state, the headlamp is deflected in the opposite direction and is set at the initial position, and the current count value for the brushless motor is obtained.

For example, as shown in FIG. 9, a left headlamp (projector lamp 3) is bumped to an angle position that is displaced about 1° inward from the 0° position, which is the initial position in the forward direction of travel. Then, the left headlamp in the bumped state is returned about 1° outward, and is set in the initial position. In this case, 1° is a slightly greater angle than an angle of 0.8°, which includes an overrun caused by the backlash and the gear deformation. As a result, as shown in FIG. 10B, where the correlation between the count value for a brushless motor and the deflection angle of a headlamp is shown, when the motor has overrun upon the bumping of the headlamp, the overrun is resolved by rotating the brushless motor about 1° in the opposite direction. Therefore, when in this state the headlamp is set at the initial position, a reliable initialization is enabled. Furthermore, according to the one-sided bumping method, the headlamp must be bumped to only one side, especially in the inward direction where the deflection angle is smaller than is that for the outward direction. Therefore, the period required for bumping can be reduced, and the initialization process can be shortened.

However, according to the one-sided bumping method, in order to resolve the error due to the overrun, the bumped position is set inward, about 1° from the initial position. Therefore, when the left headlamp is bumped in the inward direction during the initialization process, the left headlamp is deflected about 1° from the initial position, i.e., to the right in the forward direction of travel, and would dazzle the driver of a car approaching from the opposite direction. In order to prevent this dazzling, headlamps should be turned off during the initialization, or the light axes of the headlamps must be adjusted to the low level. The first case is not preferable because, for an automobile, the forward lighting is insufficient to ensure safety. The second case requires a device for adjusting the level, and the structure of the lighting direction control apparatus becomes complicated.

SUMMARY OF THE INVENTION

One or more embodiments of the present invention provide a lighting direction control apparatus that can perform initialization in a short period of time, without, for example, dazzling drivers of cars approaching from the opposite direction.

In accordance with one or more embodiments of the present invention, a lighting direction control apparatus, for a vehicle lamp including a lamp unit that is capable of deflecting a lighting direction of a lamp, may be provided with a deflection controller for controlling the lamp unit, wherein the deflection controller includes:

an initialization function, for setting the lamp at an initial position in which the lighting direction of the lamp faces substantially forward in the direction of travel of a vehicle, wherein the initialization function includes:

a function for swinging the lamp across the initial position, in a specific direction, to a bumped position, a function for swinging the lamp from the bumped position, in the direction opposite to the specific direction, across the initial position to a position at a predetermined angle, and a function for swinging the lamp at an angle across the initial position from the position at the predetermined angle by an angle that the lamp is swung over the initial position in the direction opposite to the specific direction.

Further, in accordance with one or more embodiments of the present invention, the bumped position may be a deflection angle position at which light emitted by the lamp does not dazzle a driver in another car, and the predetermined angle may be greater than a deflection error angle for the lamp unit.

It is preferable that the bumped position be set inward, from the initial position, in the widthwise center direction of an automobile. For example, the bumped position is defined as being at an angle, from the initial position, that does not exceed 1°. Further, the lamp unit may include: a motor and an actuator for swinging the lamp using a rotational force of the motor, and the actuator includes a plurality of gears.

According to one or more embodiments of the present invention, the lamp is swung in one direction (a first direction), across the initial position, and is then bumped and swung across the initial position, in the opposite direction (a second direction), to a position at a predetermined angle. Thereafter, the lamp is swung in the one direction (the first direction) to the initial position. Since the initialization is performed in this manner, the initialization process time can be shortened, compared with when a two-sided bumping method is employed. Further, when the angle at the bumped position is small relative to the initial position, the headlamp must be deflected, in the opposite direction, to a position at a predetermined angle.

Thus, the error in the deflection angle that is due to bumping can be removed, and a reliable and accurate initialization can be performed. Further, during the initialization, the dazzling of the driver of another car does not occur.

Other aspects and advantages of the invention will be apparent from the following description and the appended claims.

DETAILED DESCRIPTION OF THE EXEMPLARY EMBODIMENTS

Exemplary embodiments of the invention will be described with reference to the accompanying drawings.

Figure 1:
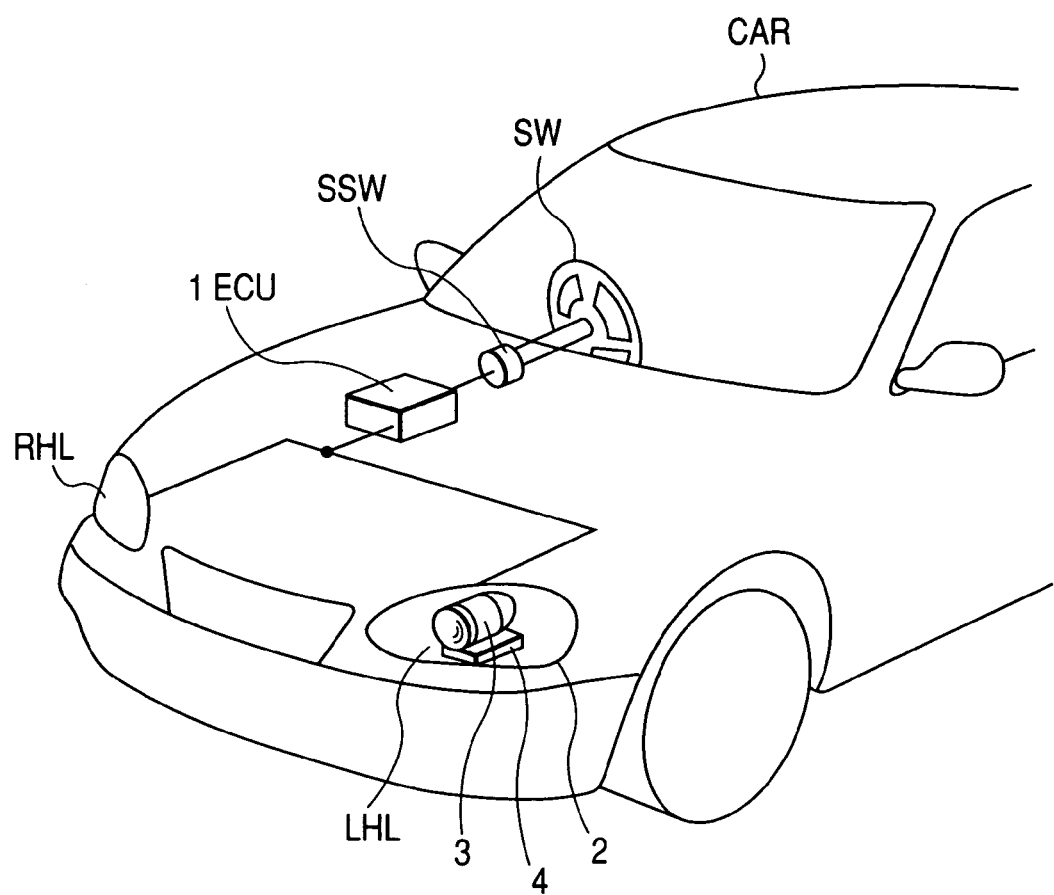
FIG. 1 is a conceptual diagram showing an automobile wherein the present invention is applied for an AFS.

FIG. 1 is a schematic diagram showing the outline of an automobile wherein exemplary embodiments of the present invention is applied for an adaptive front-lighting system (hereinafter referred to as an AFS). A steering sensor SSW for detecting a steering angle is provided for a steering wheel SW of an automobile CAR, and the output of the steering sensor SSW is transmitted to an electronic control unit (hereinafter referred to as an ECU) 1. Based on the output of the steering sensor SSW, the ECU 1 identifies the steering direction (traveling direction) of the automobile CAR, and employs the thus identified direction to deflect (swivel), in the horizontal direction, the light axes of headlamps LHL and RHL, which are located on the left and right front of the automobile CAR. As will be described later, the left and right headlamps LHL and RHL are provided as the following lamp units. The lamp units include horizontally rotary projector lamps 3, incorporated in lamp housings 2. The projector lamps 3 are to be horizontally inclined by actuators 4, which are drive mechanisms, and in this manner, the light axes of the projector lamps 3, i.e., the light axes of the headlamps LHL and RHL, can be deflected.

Figure 2:
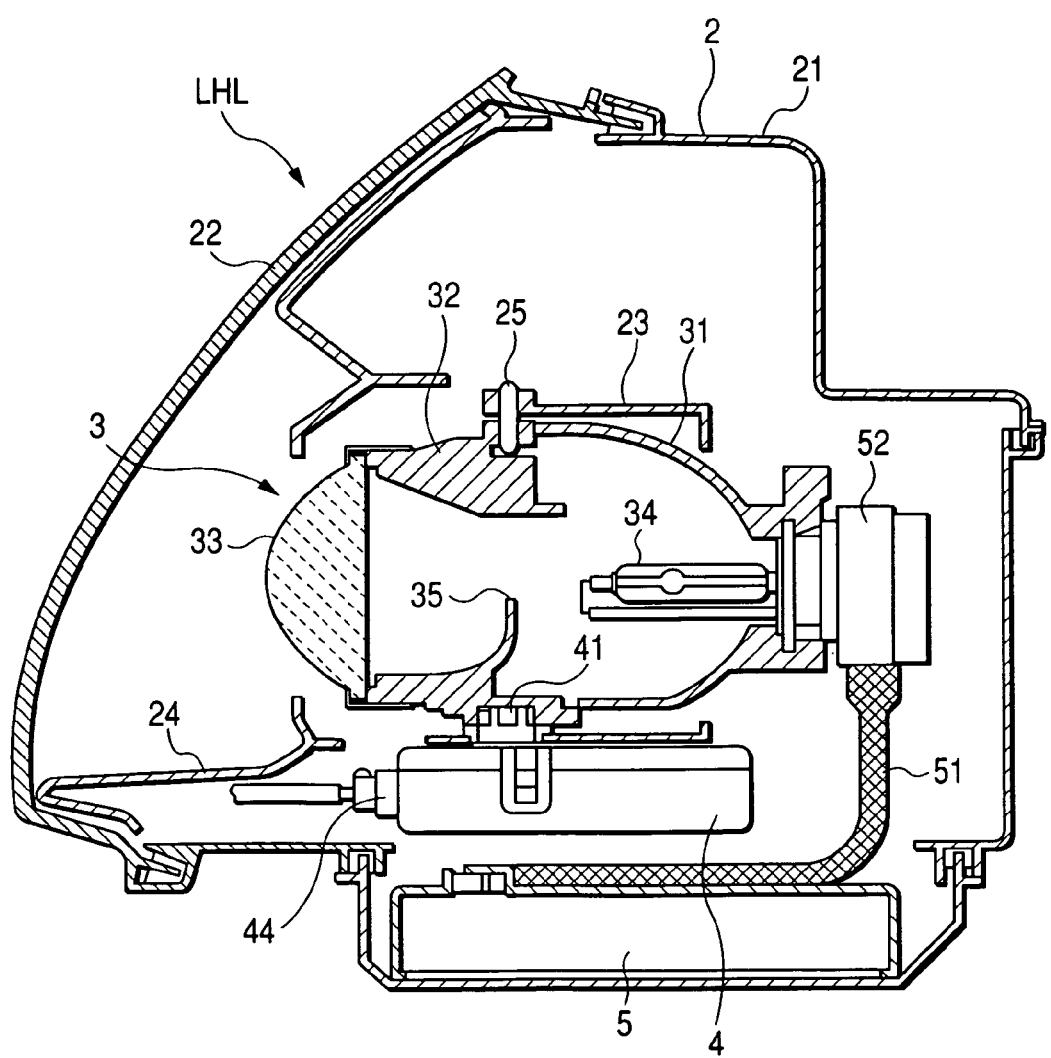
FIG. 2 is a cross-sectional view of a headlamp.

FIG. 2 is a cross-sectional view of the arrangement of the left headlamp LHL. The lamp housing 2 of the left headlamp LHL is structured by a lamp body 21 and a transparent front cover 22 attached to the front face of the lamp body 21, and the projector lamp 3 mounted in the lamp housing 2. For the projector lamp 3, a lens 33 is attached, via a cylindrical spacer 32, to the front of a reflector 31 having a hemi-spheroid shape, and an incandescent bulb or a discharge bulb is mounted as a light source 34 within the reflector 31. Further, a shade 35 for setting a cut line for emitted light is provided inside the spacer 32. The projector lamp 3 is located so as to be exposed upon the opening of an extension 24, which is supported by a support board 23 of the lamp housing 2 to hide the interior of the lamp housing 2. The upper portion of the projector lamp 3 is so supported by the support board 23 that it can be pivoted horizontally at a support shaft 25 horizontally.

Below the projector lamp 3, the actuator 4 is located that serves as a drive mechanism for performing a deflection operation, and a rotation output shaft 41 of the actuator 4 is coupled with the lower face of the projector lamp 3. Consonant with the rotation of the rotation output shaft 41, the projector lamp 3 is horizontally swung within a designated angular range, and the light axis of the projector lamp 3, i.e., the left head lamp LHL, is swiveled. In FIG. 2, a discharge lighting circuit unit 5, for lighting the discharge valve 34, is incorporated at the bottom of the lamp housing 2, and is electrically connected to the discharge valve 34 via a cord 51 and a connector 52.

Figure 3A:
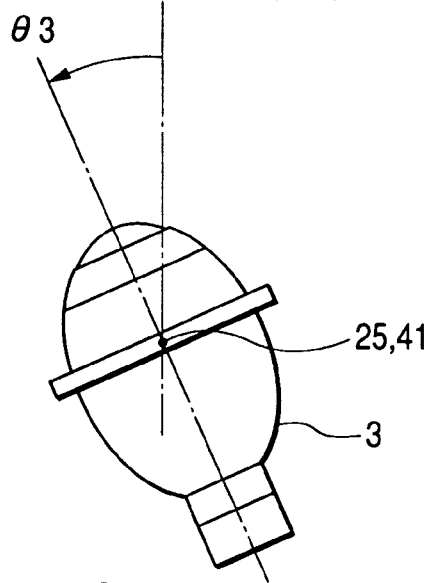
FIG. 3A is a schematic diagram for explaining a deflection operation of an actuator of a left headlamp.
Figure 3B:
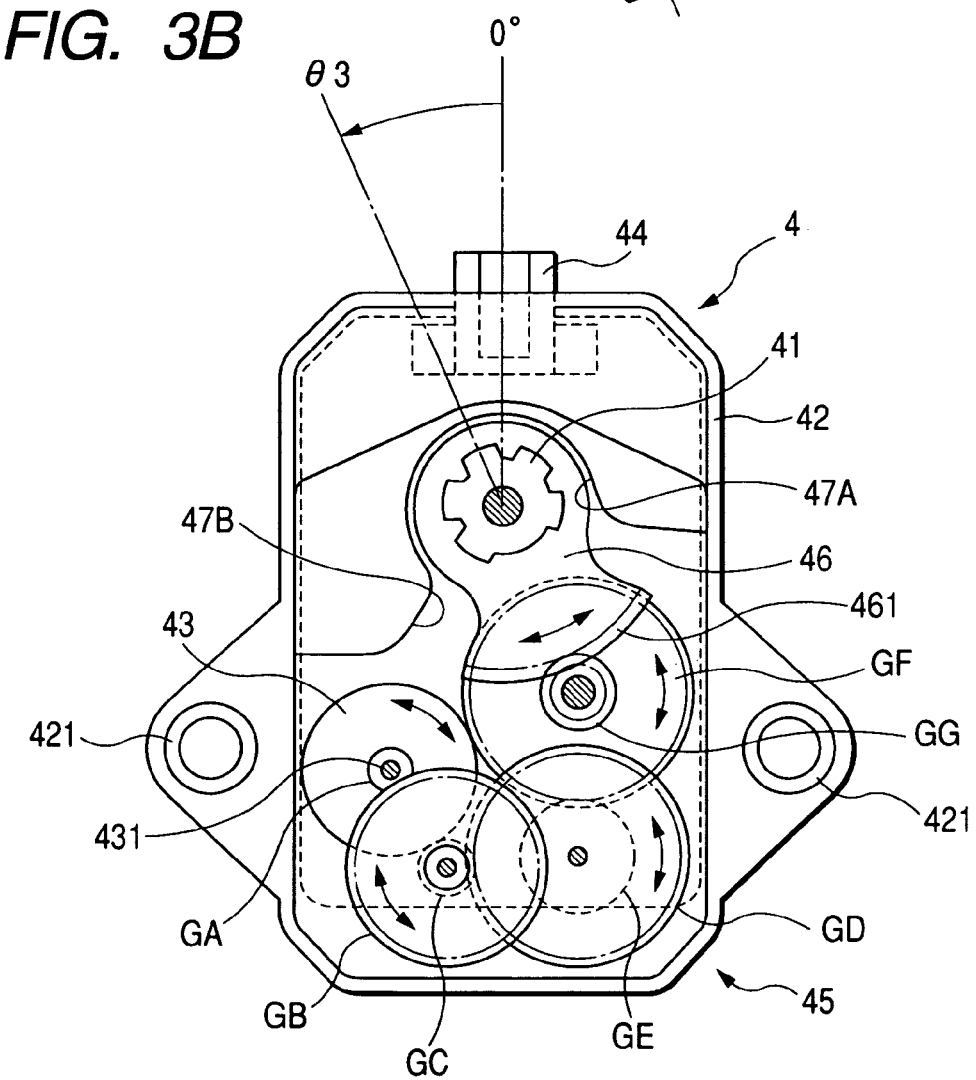
FIG. 3B is a plan view of the actuator of the left headlamp.

As shown in FIG. 3B, for the plan structure of the actuator 4 used for the left headlamp LHL, a brushless motor 43 is provided as a drive source in a housing 42. The housing 42 includes fixed pieces 421, on both sides, with which the actuator 4 is secured to the lamp housing 2 of the headlamp LHL or RHL.

The brushless motor 43 is connected to the ECU 1 via an electric connector 44 provided in the housing 42, and is moved to a rotational position in accordance with a control signal transmitted by the ECU 1, i.e., in consonance with the count value from a reference position. Furthermore, although not shown, a rotation detector, such as a Hall element, for detecting the revolutions of a motor, is provided for the brushless motor 43, and the revolutions of the motor detected by the rotation detector, i.e., the count value in this exemplary embodiment, is also output to the ECU 1.

In addition, for the actuator 4, a speed reduction gear string 45, which is constituted by sequentially engaging a plurality of gears GB to GG, is coupled with a gear GA that is fitted over a rotary shaft 431 of the brushless motor 43, and a sector gear 46 that is fitted over the output shaft 41 is rotated by the speed reduction gear string 45. In this exemplary embodiment, the gears GA to GG and the sector gear 46 are formed of a resin for weight reduction; however, these gears may be made of metal. The sector gear 46 has a gear end 461 that engages the last gear GG of the speed reduction gear string 45, and as the sector gear 46 is rotated, the rotation output shaft 41 is also rotated and deflects the projector lamp 3. Furthermore, stoppers 47A and 47B, formed of a part of the inner wall of the housing 42, are located on both sides in the rotational direction of the sector gear 46. When the sector gear 46 is rotated in either direction, the side face of the sector gear 46 contacts the opposing stopper 47A or 47B, so that the rotation of the sector gear 46 is halted.

Figure 4A:
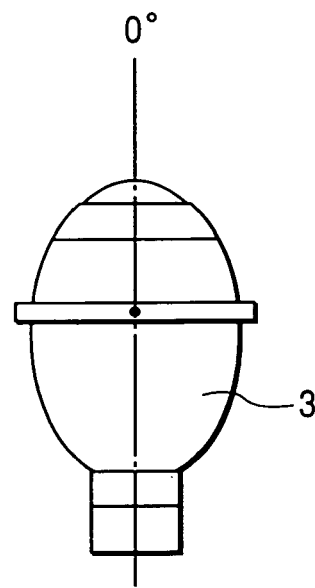
FIG. 4A is a diagram for explaining the deflection operation when the left headlamp is initialized at the initial position.
Figure 4B:
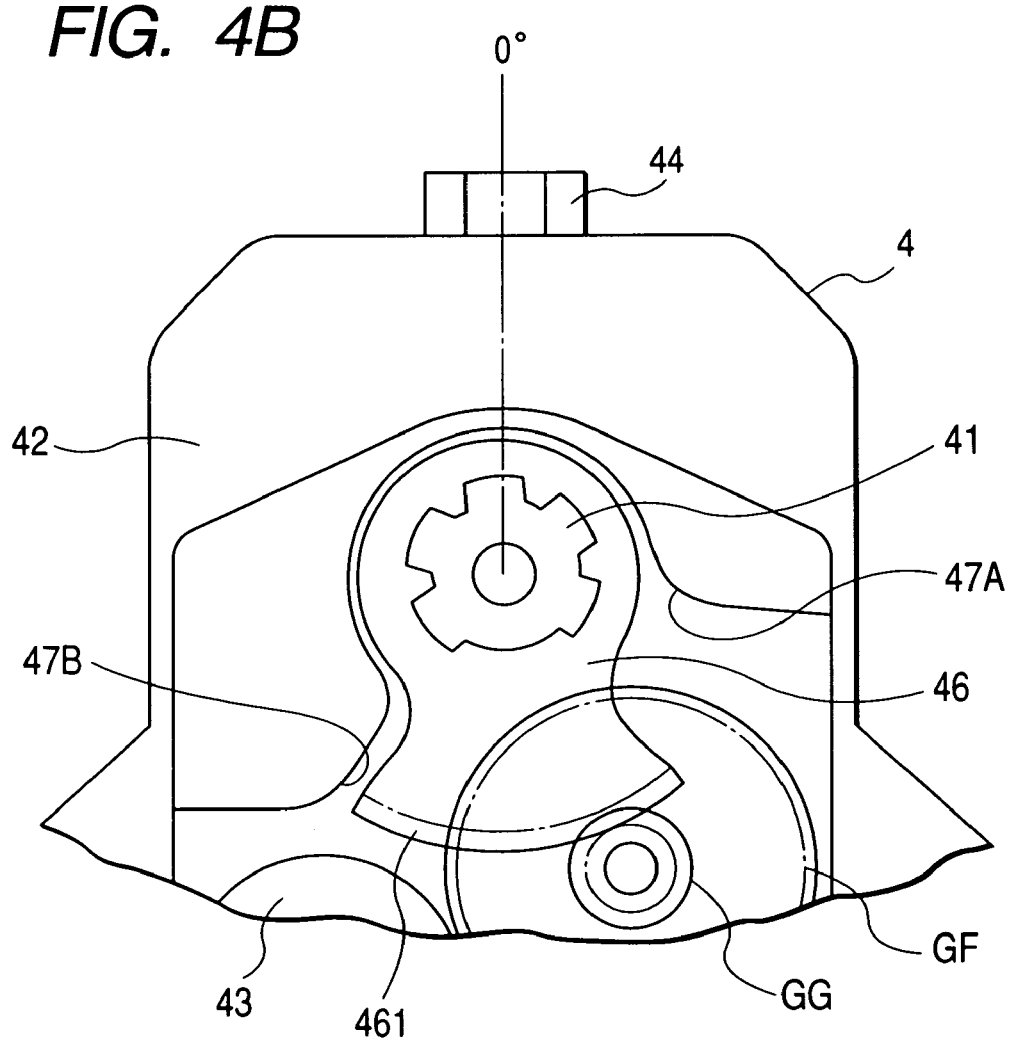
FIG. 4B is a diagram for explaining the deflection operation of the actuator when the left headlamp is initialized at the initial position.
Figure 5A:
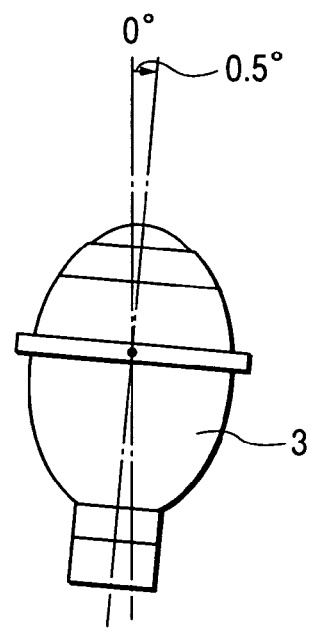
FIG. 5A is a diagram for explaining the deflection operation when the left headlamp is bumped inward.
Figure 5B:
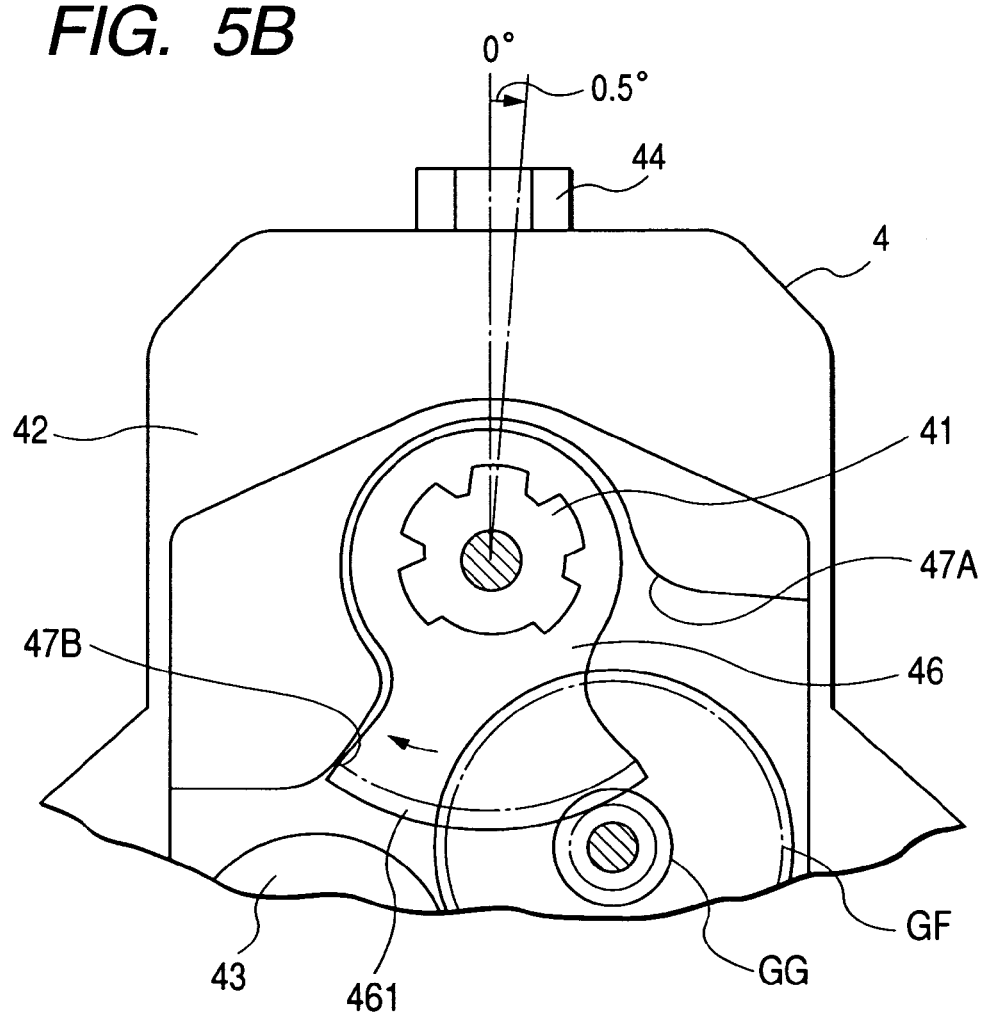
FIG. 5B is a diagram for explaining the deflection operation of the actuator when the left headlamp is bumped inward.
Figure 9:
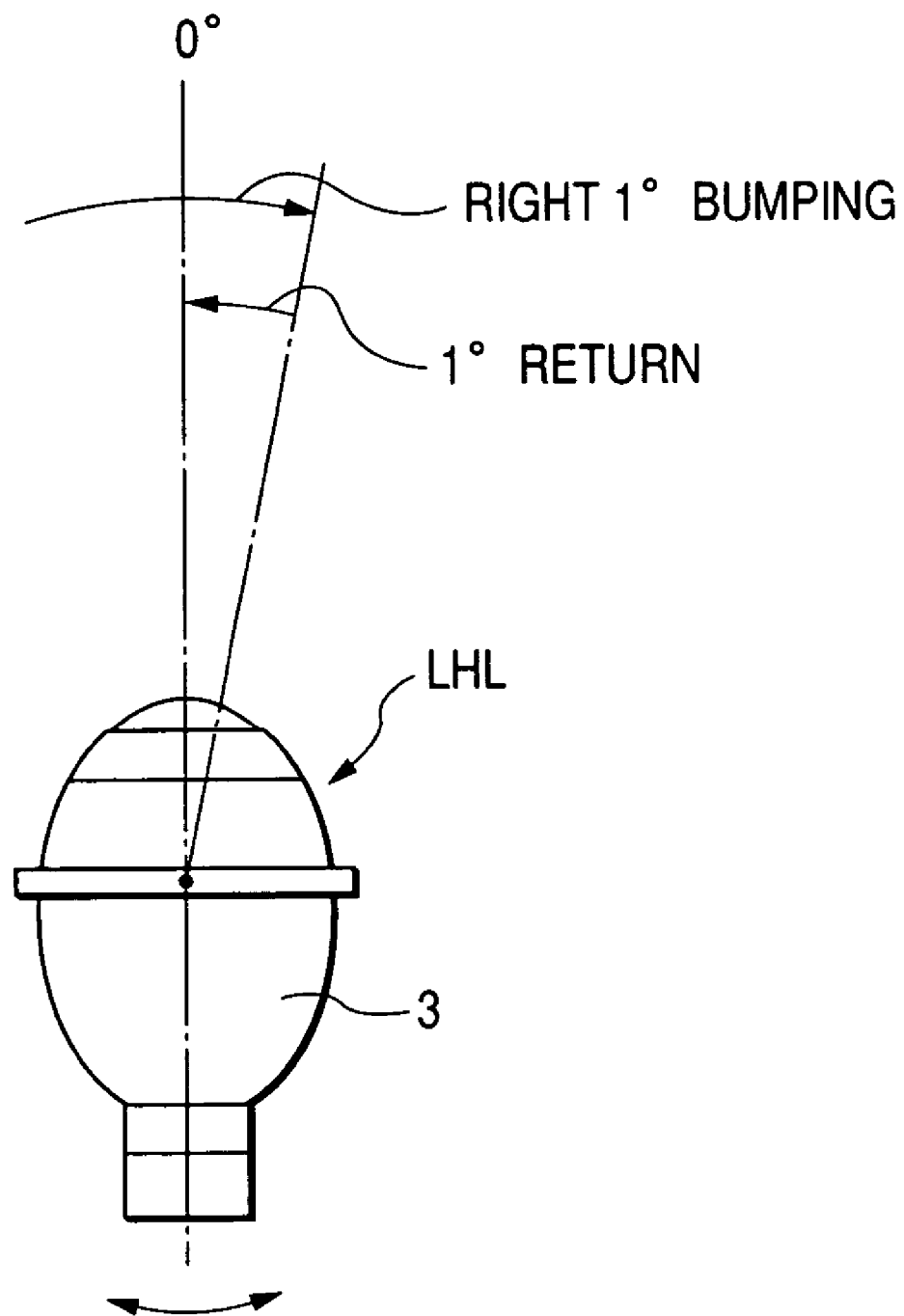
FIG. 9 is a diagram showing a deflection angle for explaining a conventional initialization operation.
Figure 10A:
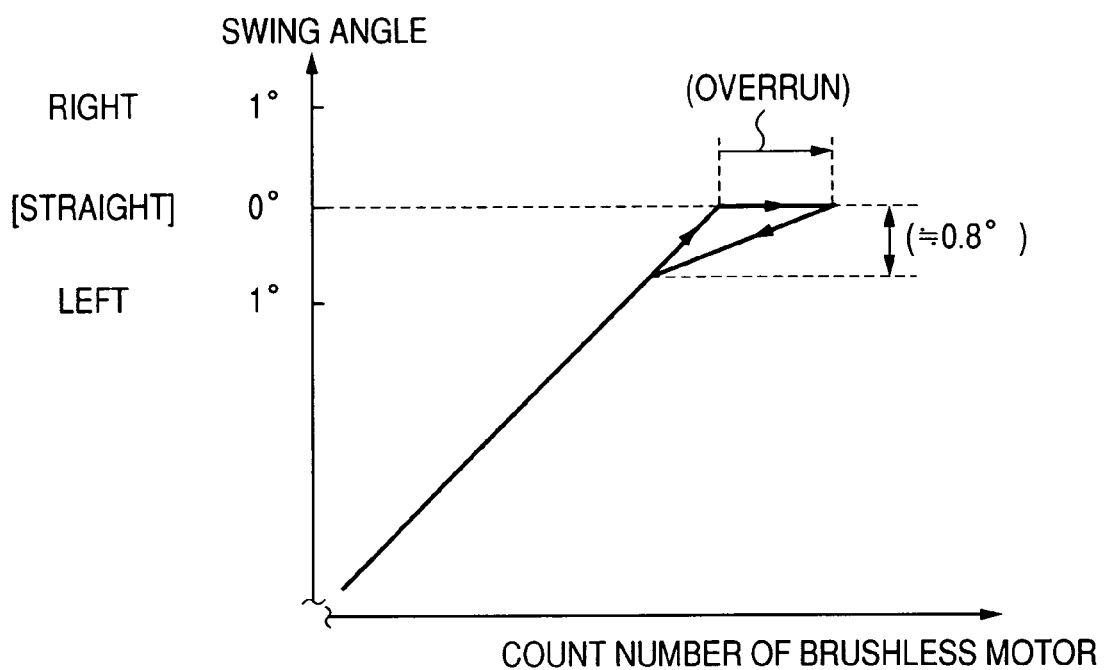
FIGS. 10A and 10B are graphs showing a correlation between the count value for a motor and a deflection angle in the conventional initialization operation.
Figure 10B:
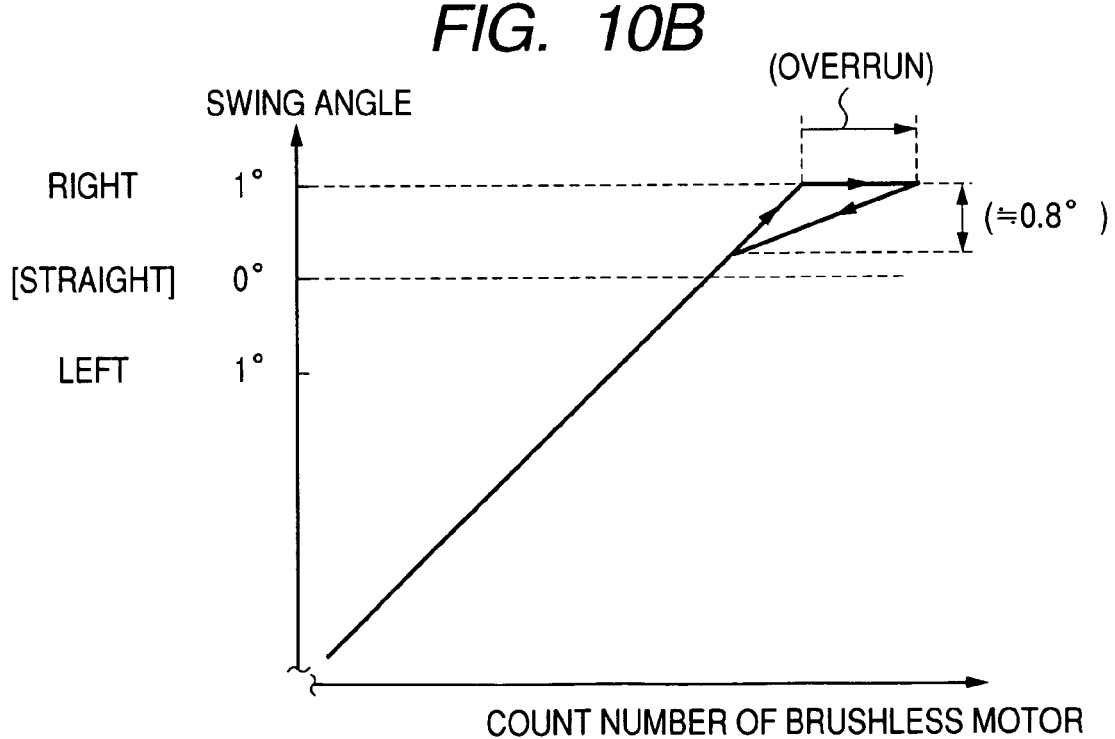

In the actuator 4, at the rotation position of the sector gear 46 shown in FIG. 3B, the projector lamp 3 is deflected, at a deflection angle θ3, to the left in the forward direction of travel, as shown in FIG. 3A. Further, as shown in FIG. 4B for the enlarged portion of the actuator 4, at the rotation position at which the sector gear 46 has been rotated to the left, from the state in FIG. 3B, to a position at a small angle, and the left side face of the sector gear 46 is near the left stopper 47B, the projector lamp 3 is deflected in the forward direction of travel, as shown in FIG. 4A. This deflection position is the initial position in the first exemplary embodiment, i.e., the initialized position. Furthermore, as shown in FIG. 5B, in a state wherein the left side face of the sector gear 46 has impinged on the left stopper 47B, the projector lamp 3 is deflected, as shown in FIG. 5A, 0.5° to the right in the forward direction of travel of the automobile, which is the initial position of the left head lamp LHL, i.e., is deflected inward relative to the automobile. The angle of 0.5°, which is the deflection position at which the projector lamp 3 is bumped, is an angle at which the driver of a car approaching from the opposite direction will not be dazzled when the left headlamp LHL is bumped to the right. It should be noted that when, as shown in FIG. 9, the left headlamp LHL is deflected inward about 1°, as described above, there is a possibility that the driver of the car approaching from the opposite direction will be dazzled.

For the right headlamp RHL, the lighting characteristic is so designated that the driver of a car approaching from the opposite direction will not be dazzled when the right headlamp RHL is deflected to the right of the automobile. Further, when the right headlamp RHL is deflected to the left of the automobile, the driver of a car approaching from the opposite direction will not be dazzled in a left hand traffic lane case, so that the bumped position in the inward direction (to the left) need not be set to 0.5°, the setting for the left headlamp LHL. However, when the automobile is traveling along a right hand traffic street lane, the right headlamp RHL would dazzle the driver of another car, and it is preferable that, as for the left headlamp LHL, the inward bumped position be set to 0.5°. Therefore, although not shown, an actuator employed for the right headlamp RHL has a structure symmetrical to that in FIG. 3B. Instead of the symmetrical structure, however, only the sector gear 46 may be changed, and in this case, the cost of the actuator can be reduced. Furthermore, in this case, stoppers may be provided for the deflection area of the projector lamp 3 instead of for the actuator, and can be brought directly into contact with the projector lamp 3 to halt the deflection.

According to the AFS having the above arrangement, when the steering angle is changed by the steering wheel SW of the automobile CAR, and when the steering angle signal detected by the steering sensor SSW is transmitted to the ECU 1, the ECU 1 transmits, to the actuator 4, a control signal indicating a count value consonant with the steering angle 1, and rotates the brushless motor 43 of the actuator 4 to the rotation angle position that corresponds to the count value. The rotational output of the brushless motor 43 is transmitted via the speed reduction gear string 45 to the sector gear 46, and rotates and positions the sector gear 46 at a required angular position.

As a result, the projector lamp 3 coupled with the rotation output shaft 41 is located at a corresponding rotational position, and the light axes of the headlamps LHL and RHL are deflected in a direction corresponding to the steering angle.

When deflection control for the headlamps is initiated, i.e., when the ignition switch of the automobile is turned on, the ECU 1 performs the initialization in order to set the brushless motor 43 at the predesignated initial position. Hereinafter, by employing the initial position as a reference, the ECU 1 calculates the count value for controlling the brushless motor 43 and outputs the above described control signal, deflecting the light axes of the projector lamps 3 for the headlamps LHL and RHL.

Figure 6:
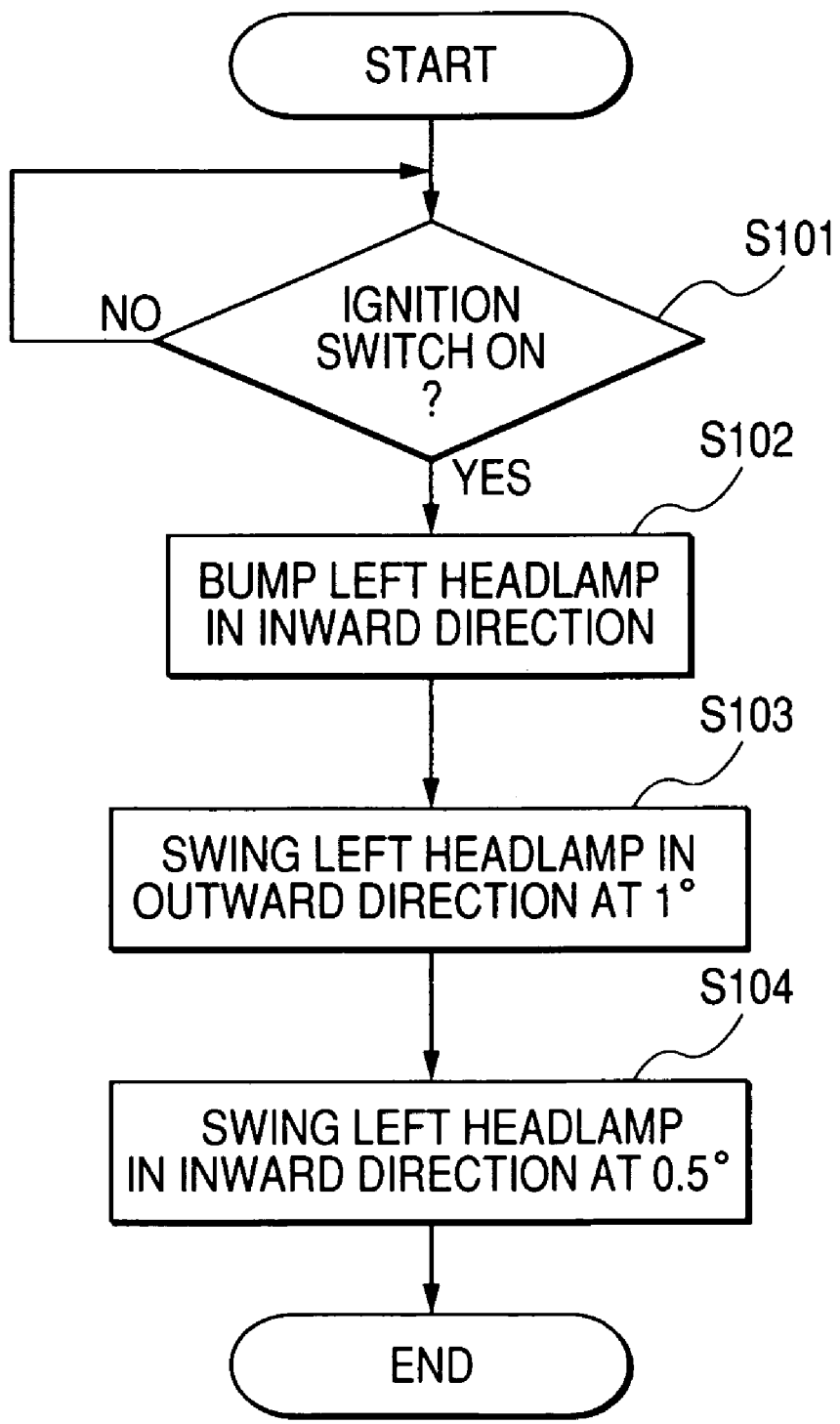
FIG. 6 is a flowchart for explaining the initialization operation for one exemplary embodiment of the present invention.
Figure 7:
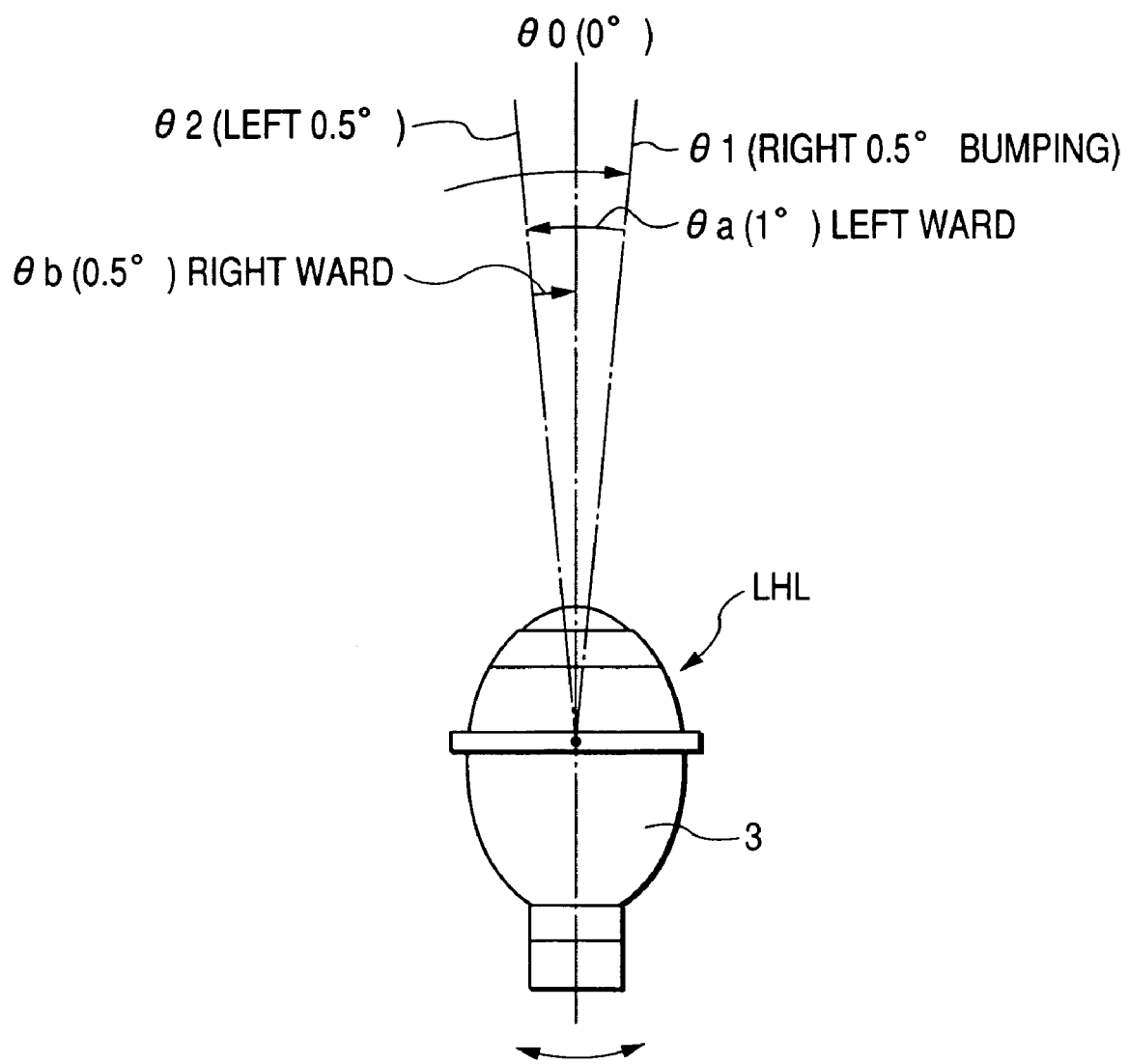
FIG. 7 is a diagram showing a deflection angle for explaining the initialization operation of the exemplary embodiment.

The initialization operation for setting the initial position will now be described. FIG. 6 is a flowchart for the initialization operation, and FIG. 7 is a schematic diagram showing the deflected state of the left headlamp LHL at this time. When the ECU 1 has determined that the ignition switch has been turned on (S101), the ECU 1 initiates the initialization.

First, a bumping signal is output to the actuator 4 of the left headlamp LHL, the brushless motor 43 is rotated in one direction, and the left headlamp LHL is swung inward by the actuator 4, i.e., to the right, and is set to the bumped state (S102). That is, the brushless motor 43 is rotated so as to turn the sector gear 46 of the actuator 4 of the left headlamp LHL to the right until the sector gear 46 impinges on one of the stoppers 47B. Thus, as shown in FIG. 5A, the left headlamp LHL is halted at the position where the light axis of the projector lamp 3 has a deflection angle θ1 of 0.5° to the right in the forward direction of travel (the initial position) of the automobile. As previously described, the headlamp at the position for the deflection angle θ1 will not dazzle the driver of a car approaching from the opposite direction.

Following this, the ECU 1 outputs a reciprocal signal to invert the brushless motor 43, and permits the actuator 4 to deflect the projector lamp 3 of the left headlamp LHL outward, i.e., to the left, at an angle of θa, i.e., 1° in this case (S103). At this time, the ECU 1 counts a rotation angle signal (pulse signal), output by the rotation detector of the brushless motor 43, and deflects the projector lamp 3 to the left to an exact angle of 1°. The position of this deflection angle, as well as the deflection angle θ2 shown in FIG. 7, is the position deflected to the left from the initial position at an angle of 0.5°.

Thereafter, the ECU 1 outputs a setup signal, rotates the brushless motor 43 forward again, and permits the actuator 4 to deflect the projector lamp 3 of the left headlamp LHL inward, i.e., to the right, at an angle θb, i.e., 0.5° in this case (S104). Also at this time, the ECU 1 counts a rotation angle signal output by the rotation detector of the brushless motor 43, and deflects the projector lamp 3 to the right to an exact angle of 0.5°. This deflection position, as well as the deflection angle θ0 shown in FIG. 7, corresponds to the initial position, i.e., the forward direction of travel (angle 0°). In this manner, the initialization is completed. The same initialization operation is performed for the right headlamp RHL, while the direction is reversed.

Figure 8A:
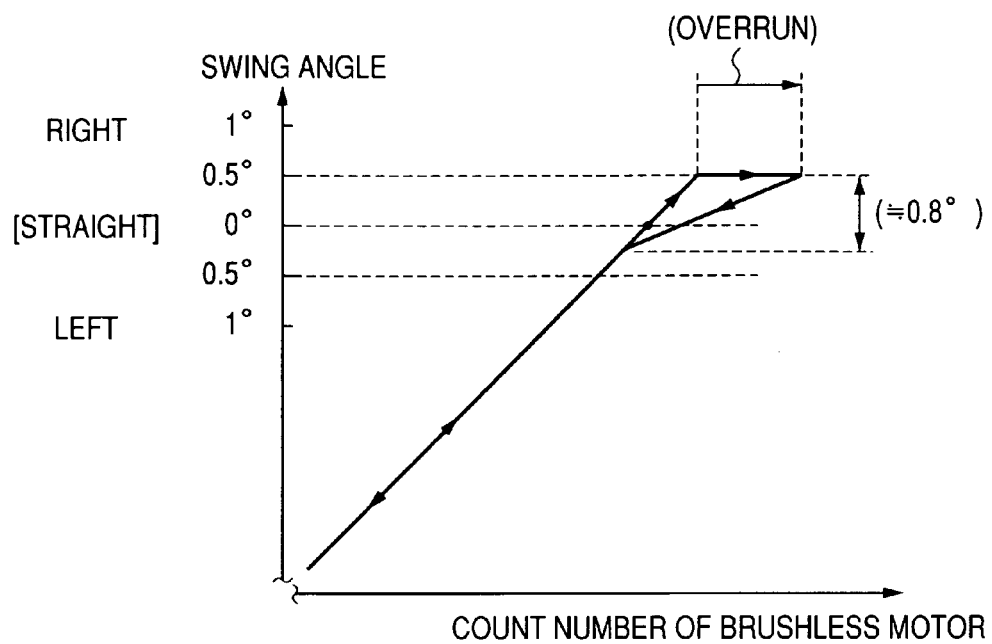
FIGS. 8A and 8B are graphs showing a correlation between the count value for a motor and a deflection angle in the initialization operation for the exemplary embodiment.
Figure 8B:
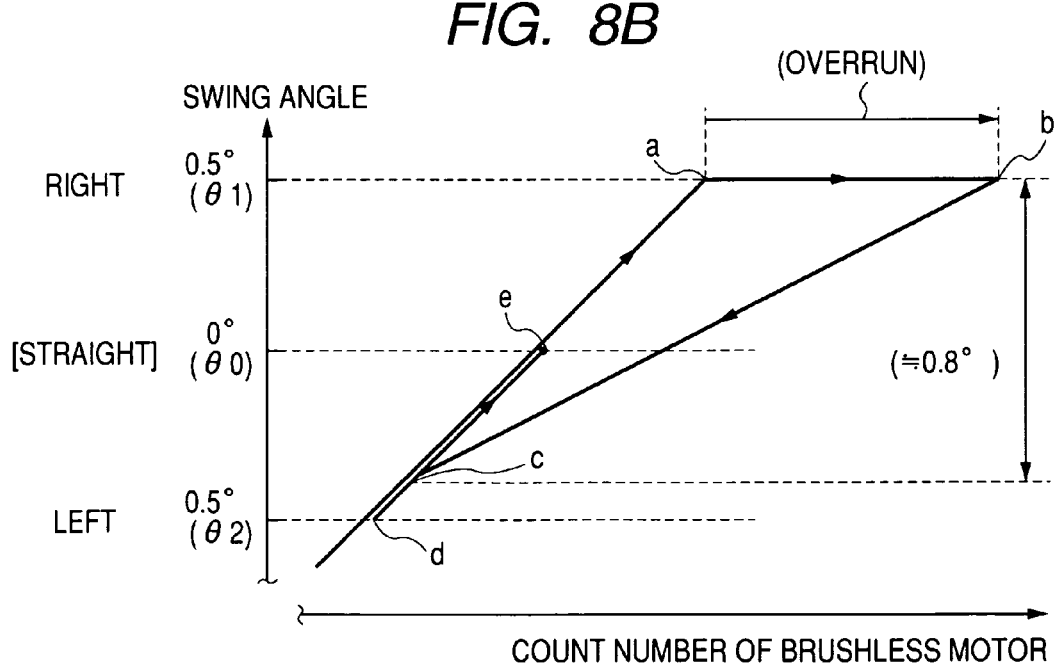

FIG. 8A is a graph showing a correlation between the count value for the brushless motor 43 in the above described initialization operation, and the deflection angle of the projector lamp 3 of the left headlamp LHL. FIG. 8B is a partially enlarged graph of FIG. 8A. In a state indicated by "a" in FIG. 8B, by rotating the brushless motor 43 the projector lamp 3 of the left headlamp LHL is rotated across the initial position, at an angle of 0.5°, and is bumped. At this time, as previously described, because of backlash or deformation of the gears in the actuator 4, there is overrun by the brushless motor 43 a distance equivalent to a deflection angle of 0.3°+0.5°=0.8° (b in FIG. 8B). However, when the brushless motor 43 is rotated in reverse so as to deflect the projector lamp 3 outward at an angle of 1°, the overrun caused by the backlash or the deformation of the gears of the speed reduction gear string 45 of the actuator 4, i.e., the hysteresis of an error, is eliminated. And the count value for the brushless motor 43 is correlated with the deflection angle of the projector lamp 3 (c in FIG. 8B) In this embodiment, for safety's sake, the brushless motor 43 is reversely rotated, outward until an angle of 0.5° is reached (d in FIG. 8B). Then, the brushless motor 43 is rotated forward to deflect the projector lamp 3 inward at an angle of 0.5°, so that the projector lamp 3 can be set at the initial position (e in FIG. 8B) Since the projector lamp 3 need not be bumped when it is set at the initial position, overrun does not occur due to backlash and deformation of the gears of the actuator 4, and the initialization process can be performed, without error, in consonance with the count value for the brushless motor 43.

That is, ECU 1 is provided with an initialization unit that sets the lamp LHL, RHL at the initial position. The initialization unit is structured by: a bumping mechanism that swings the lamp in a first direction (inward) across the initial position to the bumped position (S102); a reverse swing mechanism that swings the lamp in a second direction (outward) from the bumped position across the initial position to a position at the predetermined angle (S103); and a return mechanism that swings the lamp in the first direction from the position at the predetermined angle by an angle that the lamp is swung over the initial position in the second direction (S104).

As described above, in the exemplary embodiment of the present invention, one-sided bumping of the headlamp is performed during the initialization, i.e., the headlamp is bumped inward at a position having a deflection angle smaller than the initial position. Therefore, compared with the two-sided bumping described in JP-A-2004-106770, the initialization period can be shortened. Further, in order to eliminate an error due to the overrun that is caused by one-sided bumping, the angle for deflecting the headlamp inward across the initial position is set to 0.5°, smaller than 1°. Thus, when the left headlamp LHL is deflected inward, the left headlamp LHL will not dazzle the driver of another car, such as a car approaching from the opposite direction. Furthermore, when the angle for deflecting the headlamp inwardly is set to 0.5°, the headlamp is deflected outwardly at an angle of 1° across the initial position. Therefore, an error due to the overrun can be resolved by this deflection, and without being bumped thereafter, the headlamp is set at the initial position. As a result, a reliable initialization operation can be provided. Therefore, the succeeding deflection control for the headlamp of the AFS can be performed highly accurately.

According to this exemplary embodiment, an explanation has been given for a case wherein 0.8° is the total overrun due to the backlash and the deformation of gears of the actuator, and wherein, in order to remove an error due to the overrun, the headlamp is deflected, in the opposite direction, at an angle of 1° from the bumped position. However, when the value of the angle for the overrun differs, accordingly, the angle for the deflection in the opposite direction differs. Naturally, in order to resolve an error that occurs due to the overrun, the headlamp should be deflected, in the opposite direction, an angle equal to or greater than the angle for the overrun.

Furthermore, according to the exemplary embodiment, when a headlamp is deflected, in the opposite direction, an angle of 1° in order to resolve an error due to overrun, the position, inward across the initial position at an angle of 0.5°, is defined as the bumped position, and the headlamp is deflected, in the opposite direction, an angle of 1° from the bumped position.

However, the 0.5° angle is an arbitrary angle, and only an angle at which the headlamp will not dazzle the driver of a car approaching from the opposite direction need be set. For example, in a case wherein the driver of another car will not still be dazzled when the headlamp is deflected inward an angle of 0.7°, from the initial position, the bumped position may be set inward, from the initial position, as the position 0.7°.

Then, after the headlamp is bumped and is deflected outward at an angle of 1°, the headlamp may again be deflected inward at an angle of 0.3°, and may be set in the initial position.

The present invention is not limited to the headlamps, as in the exemplary embodiment, that deflect the projector lamps, but also can be applied for a light source control apparatus that permits an actuator, which employs a brushless motor as a drive source, to deflect the light axes of headlamps.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A lighting direction control apparatus of a vehicle lamp including a lamp unit that is capable of deflecting a lighting direction of a lamp, the lighting direction control apparatus comprising:

a deflection controller that controls the lamp unit, wherein the deflection controller comprises:

an initialization unit to set the lamp at an initial position, wherein the lighting direction of the lamp is substantially in a forward direction of the vehicle when the lamp is set in the initial position, and wherein the initialization unit comprises:

a bumping mechanism that swings the lamp across the initial position in a first direction, wherein the first direction is a direction toward the center of the vehicle and the lighting direction of the lamp is directed towards the center of the vehicle, to a bumped position that is toward the center of the vehicle, a reverse swing mechanism that swings the lamp from the bumped position in a second direction, which is opposite to the first direction and is a direction away from the center of the vehicle, across the initial position to a position at a predetermined angle, and stopping the lamp at the predetermined angle, without bumping the lamp as it moves in the second direction, and a return mechanism that swings the lamp in the first direction from the position at the predetermined angle by an angle that the lamp swung over the initial position in the second direction, wherein the bumped position is a deflection angle position at which light emitted from the lamp does not interfere with a driver in another vehicle traveling in a opposite direction, and the predetermined angle is greater than a deflection error angle of the lamp unit; and wherein the initialization unit is configured to set the lamp at the initial position without adjusting a light axis of the lamp in a vertical direction when the lamp is turned on.

2. The lighting direction control apparatus according to claim 1, wherein the bumped position is at an angle, from the initial position, that does not exceed 1°.

3. The lighting direction control apparatus according to claim 1, wherein the lamp unit includes a motor and an actuator for swinging the lamp using a rotational force of the motor, and the actuator includes a plurality of gears.

4. The lighting direction control apparatus according to claim 1, wherein the predetermined angle is over 0.8° from the bumped position in a second direction.

5. The lighting direction control apparatus according to claim 4, wherein the predetermined angle is substantially 1°.

* * * * *